(12) United States Patent
McAllister

(10) Patent No.: US 7,089,702 B2
(45) Date of Patent: Aug. 15, 2006

(54) FLEXIBLE CLAMP DEVICE WITH INSECT BAIT STATION

(75) Inventor: Robert J. McAllister, Solana Beach, CA (US)

(73) Assignee: McAllister Products, Inc., Solana Beach, CA (US)

( * ) Notice: Subject to any disclaimer, the term of this patent is extended or adjusted under 35 U.S.C. 154(b) by 301 days.

(21) Appl. No.: 10/655,081

(22) Filed: Sep. 3, 2003

(65) Prior Publication Data

US 2005/0044776 A1     Mar. 3, 2005

(51) Int. Cl.
*A01M 1/20* (2006.01)
*A01M 25/00* (2006.01)

(52) U.S. Cl. ......................................... 43/131
(58) Field of Classification Search .................. 43/131
See application file for complete search history.

(56) References Cited

U.S. PATENT DOCUMENTS

| | | | | |
|---|---|---|---|---|
| 280,291 A | * | 6/1883 | Bunnell | 43/121 |
| 1,569,170 A | * | 1/1926 | Braun et al. | 43/121 |
| 1,718,432 A | * | 6/1929 | Qualmann | 119/464 |
| 1,780,407 A | * | 11/1930 | Smith | 239/36 |
| 1,780,408 A | * | 11/1930 | Smith | 239/36 |
| 1,821,288 A | * | 9/1931 | Beetem | 43/131 |
| 2,004,841 A | * | 6/1935 | Vinson | 43/131 |
| 2,101,988 A | * | 12/1937 | Epstein | 43/131 |
| 2,112,229 A | * | 3/1938 | Davis | 52/101 |
| 2,139,040 A | * | 12/1938 | Salfisberg | 206/466 |
| 4,837,969 A | | 6/1989 | Demarest | |
| D377,961 S | | 2/1997 | Dickson et al. | |
| 6,401,384 B1 | | 6/2002 | Contadini et al. | |

* cited by examiner

Primary Examiner—Kurt Rowan
(74) Attorney, Agent, or Firm—The Maxham Firm

(57) ABSTRACT

A clamp for affixing a pliable bag to a container and to control the crawling insect population at or near the container. The clamp contains an insect bait station on one surface thereof. The device can be deformed to an open position and normally assumes a closed position. While in the closed position, the clamp is in condition to secure a bag to a container. The clamp may be deformed to place it in position on the lid of a container, and to allow release of the bag from the container.

15 Claims, 6 Drawing Sheets

FLEXIBLE CLAMP DEVICE WITH INSECT BAIT STATION

BACKGROUND OF THE INVENTION

1. Field of the Invention

The present invention generally relates to clamping devices, and more particularly to an efficient clip device to fasten a plastic trash bag to a rigid container, where the clip includes an insect bait station to control crawling insects.

2. Discussion of the Related Art

Virtually all human activity results in the generation of some refuse or waste. The sanitary storage and collection of waste is a hallmark of a civilized society. People generally store waste, or trash, in relatively small containers ranging anywhere from one to 55 gallons in size. Plastic or paper liners, or bags, are frequently used in an effort to keep these containers clean, and to facilitate removal of the trash. These liners are placed inside the rigid trash container and frequently are fastened to the container by folding the upper section of the bag over the lip of the container.

Several disadvantages exist with this arrangement. When garbage is placed in the bag, the bag often detaches from the lip and falls to the bottom of the container, where it becomes another trash item. Attempts to remedy this by closely matching the size of the bag opening with the size of the container opening frequently result in bags that split or tear when folded over the container lip. A bag that splits, or otherwise detaches from the container fails to perform its primary tasks of holding the refuse placed within it, and protecting the container from soiling.

It is also well known that refuse or waste from human activity attracts flying and crawling insects. Residual organic matter on the waste can provide sustenance for these insects, giving them the opportunity to grow and proliferate. Often this occurs in undesirable locations, especially where trash containers are located in living areas.

In addition, many devices containing poisonous bait to control crawling insects are known. They exist in numerous shapes, sizes and configurations. In general, the insects are attracted to the bait and when it is consumed, the insect dies. The bait also may be carried back to a group of insects, and when the group feeds on the bait they die. Generally, these bait stations contain the bait securely so that it does not become dislodged from the device during normal use. Such bait stations are preferably constructed so that no bait is accessible to a child attempting to probe the device with a stick or other object. More specifically, the bait stations are constructed so that insects have easy access to the bait, that being the primary purpose of these devices.

SUMMARY OF THE INVENTION

The present invention solves the problems of pliable bags becoming detached from containers, and the undesirability of the existence of crawling insects at the container. Broadly, the present invention provides for the secure removable fastening of bags to containers, while at the same time controlling the crawling insect population.

More specifically, according to one embodiment of the invention, a pliable bag is attached to a container by locating a clip over a portion of the bag and container lip or rim so that a gripping section of the clip secures the bag against the container. The clip is positioned over the bag and container rim by applying pressure to an upwardly projecting grip, which causes the arms of the clip to separate sufficiently to be placed over the bag that is laid over the rim of the container. The clip secures the bag and container once pressure is removed from the grip.

The clip also includes an insect bait station on at least one surface. The bait station is made up of a bait poisonous to crawling insects and it also provides a passage for the insect to detect and consume the bait. In one embodiment, the bait station is on the top of the clip. However, in embodiments where the container has a lid, the bait station is more preferably located on an exposed arm of the clip.

Devices constructed according to the invention afford users a number of distinct advantages. First, trash bags no longer need to be sized to match the size of the container opening, thus avoiding the possibility of tearing the bags. Second, the bag remains securely attached to the container lip at all times and thus can perform its intended functions of containing refuse and protecting the container from being soiled by the refuse. Additionally, the clip according to some embodiments of this invention has a low profile so that when it is in use it does not interfere with use of the container cover to close the top of the container. All embodiments also provide the ability to control crawling insect populations at the same time.

BRIEF DESCRIPTION OF THE DRAWING

The objects, features and advantages of the invention will become more apparent to those skilled in the art after considering the following detailed description, when read in connection with the accompanying drawing, wherein.

DETAILED DESCRIPTION OF THE PREFERRED EMBODIMENTS

Throughout this description, the embodiments and examples shown should be considered as exemplars, rather than as limitations on the present invention. In the following paragraphs, embodiments of the present invention will be described in detail by way of example with reference to the attached drawings.

The clamping device according to various embodiments of the present invention includes an insect bait station that allows crawling insects to enter, consume the bait and die. It also provides a quick and reliable way to secure or fasten a pliable bag to a container by using two gripping arms and a clasp that forces the gripping arms to removably hold the bag against the container. The clamp also has a low profile that permits container lids to fit over the container without interfering with the clamp. The clamp is also easy to use and inexpensive. In some embodiments the clamp achieves flush mounting to the container rim. In additional embodiments, the clamp can be curved along its horizontal axis, thereby providing that the bag is secured to the container in an enhanced manner.

Figure 1:
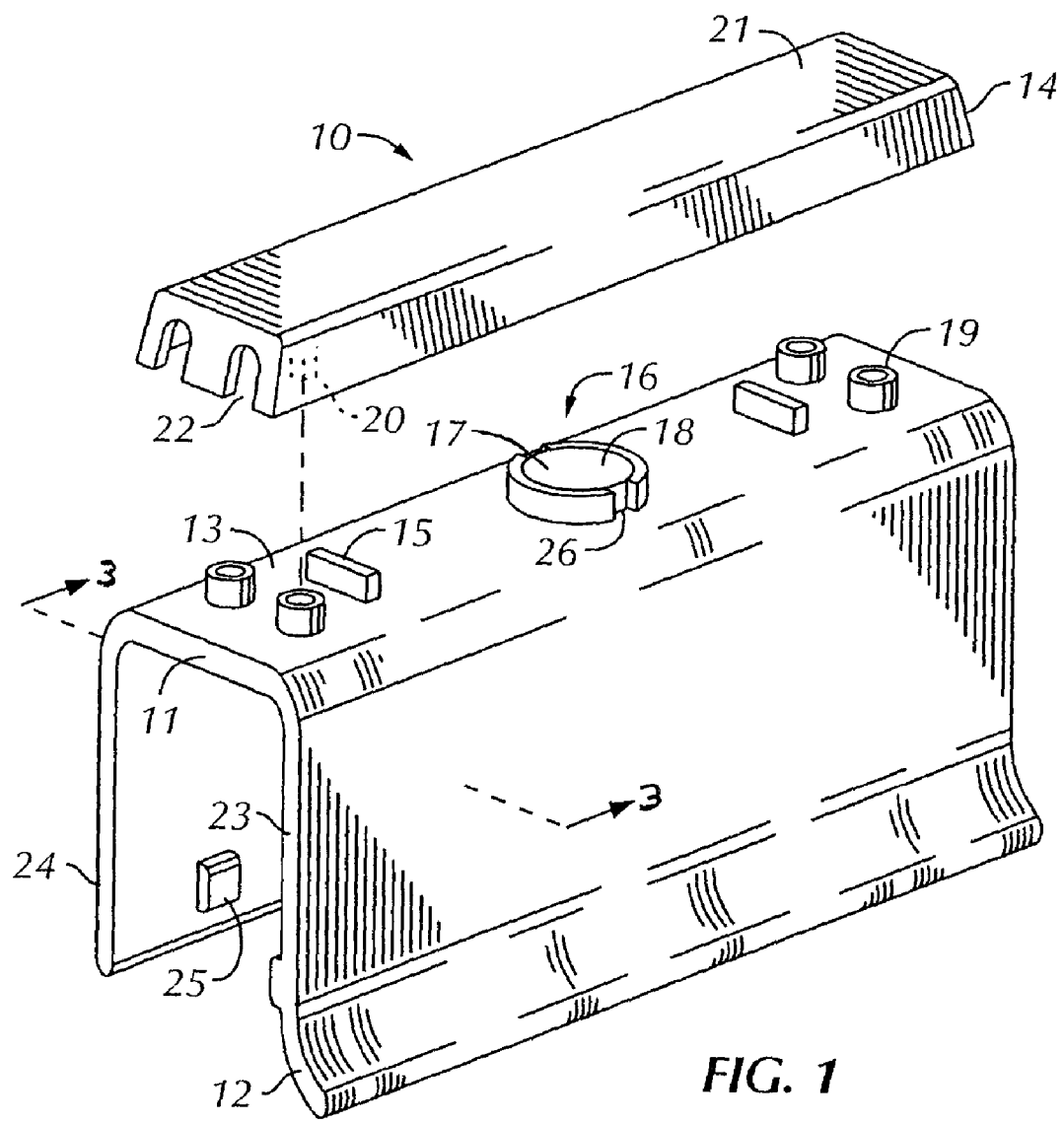
FIG. 1 is a perspective view of one embodiment of the clamping device of the present invention.
Figure 2:
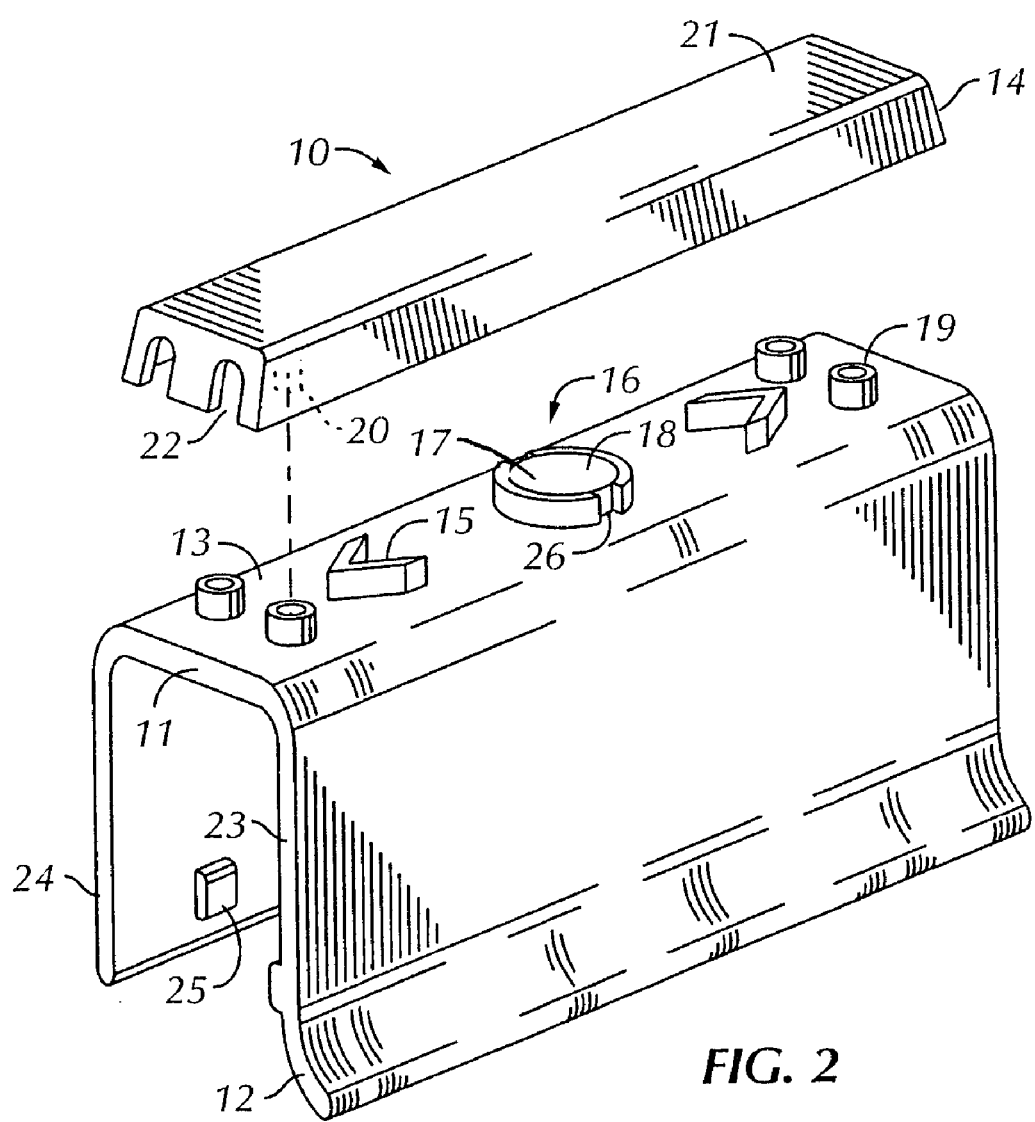
FIG. 2 is a perspective view of another embodiment of the present invention showing an alternate form of the insertion barrier.

Referring to FIGS. 1 and 2, a device in accordance with the invention is illustrated and designated generally by numeral 10. Bridging element 11 has top surface 13 and connects two arms or legs, 23 and 24. The distal edge of arm 23 is shown with extended lip 12. That lip is shaped and configured to facilitate removal of the clamp from the container rim. The bridging element temporarily deforms when outward pressure is applied to extended lip 12, thereby enabling arms 23 and 24 to be forced (splayed) apart slightly.

Although lip 12 is shown across the entire distal edge of arm 23, it is also contemplated herein that lip 12 could, for example, extend only along a portion of this distal edge. In addition, it is also contemplated herein that lip 12 could be on the distal edges of both arms. This embodiment of the invention also comprises any other structure, including a tab or block for example, on the distal edge of the arms, which would be suitable to facilitate removal of the clamp from the container. It is also contemplated that the length of lip 12 can vary, depending on the amount of leverage desired. It is generally understood that the longer the lip, that is, the further it extends from leg 23, the greater the amount of leverage that is available.

Inward projections 25 are preferably staggered along the inner surfaces of arms 23 and 24. The projections are preferably rounded so as to prevent tearing of the bag. Alternatively, the inner surfaces of arms 23 and 24 can have ribbed or other non-smooth configurations. For example, it is also contemplated herein that the inner surfaces of the arms can have projections, ridges, grooves, cross-hatching, or any other suitable configuration that might occur to those skilled in the art to be able to provide sufficient retention while not promoting unacceptable tearing of the bag.

FIGS. 1 and 2 show bait station 16 on the top surface of the bridging element. The bait station has a bait receiving position such as well 17, in which poisonous insect bait material 18 is placed. Well 17 has openings 26 which expose lateral portions of the bait and allow insect access.

Cover 14 is placed on top surface 13 of the bridging element, thereby covering the bait station and protecting, for example, children from coming into contact with the bait. Pegs 20 in the cover engage with holes formed in bosses 19, thereby forming an interference fit and a relatively tight connection. Any other suitable engagement arrangement is also contemplated herein, so long as the connection is relatively tight. Openings 22, located on one or both ends of cover 14, allow crawling insects access to the bait station. Insertion barrier 15 is positioned approximately in front of openings 22 and serves to prevent the insertion of an elongated element or probe into the device and into the bait. This is particularly designed for child safety. Further, FIGS. 1 and 2 show that well openings 26 are positioned on an axis perpendicular to openings 22, thereby making access to the bait by children even more difficult and unlikely. In FIG. 1, insertion barrier 15 is generally a rectangular element placed in front of opening 22. In FIG. 2, insertion barrier 15 is generally V-shaped, and could be any other suitable shape which serves to deflect any object that might be inserted through openings 22.

Top surface 21 of cover 14 is also preferably shaped and configured for the placement thereon of visual information, such as instructions for use. In one embodiment, the top surface is flat. In addition to script, graphical information can be placed on the top surface.

Figure 3:
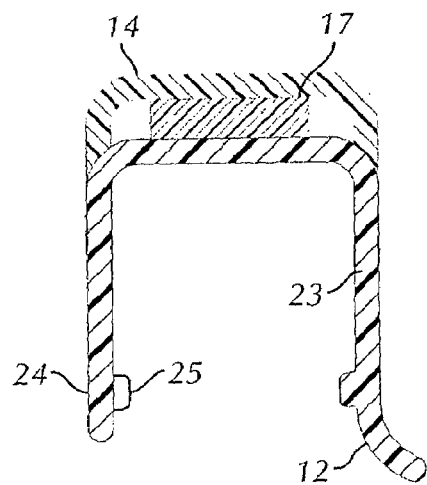
FIG. 3 is an end sectional view taken along cutting plane 3—3 in FIG. 1.
Figure 4:
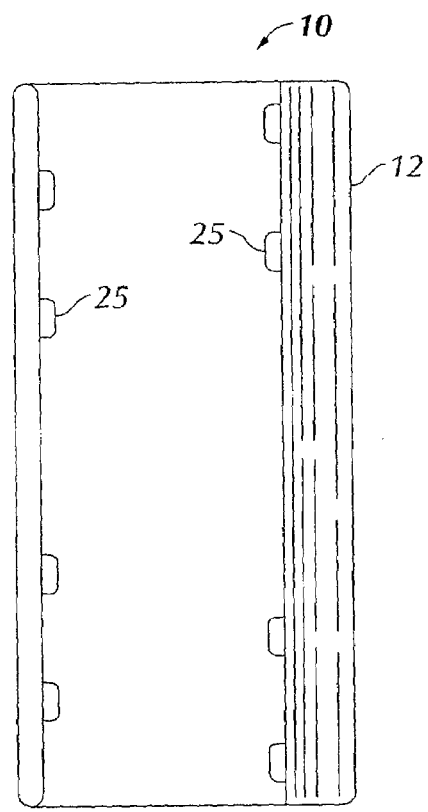
FIG. 4 is a bottom elevation view of one embodiment of the present invention.

FIG. 3 is an end sectional view of clamp 10 taken along cutting plane 3—3 of FIG. 1. Examples of placement of inward projections 25 are shown, together with a clear view of extended lip 12. Cover 14 is shown placed on top of the bridging element and well 17. FIG. 4 is a bottom view of clamp 10, also showing extended lip 12 and the placement of inward projections 25. Also if desired, clamp 10 can be of the same, or at least approximately the same, color as the container to which it is secured. This color can be applied during or after manufacture, according to procedures well known to those skilled in the art.

Figure 5:
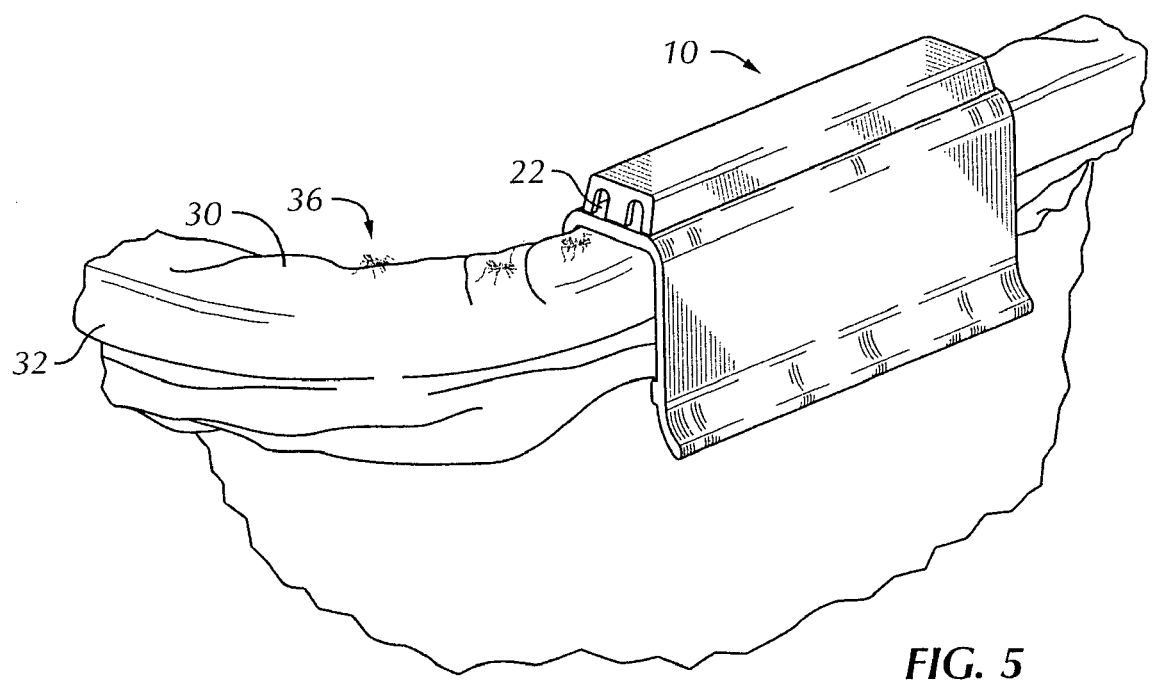
FIG. 5 is a perspective view of one embodiment of the present invention showing the clip positioned over a container lip and bag.

FIG. 5 shows placement of clamp 10 holding bag 30 over rim 32 of a container. Crawling insects 36 are shown entering the device at openings 22. In this embodiment, the bait station is placed on top of the clamp.

Figure 6:
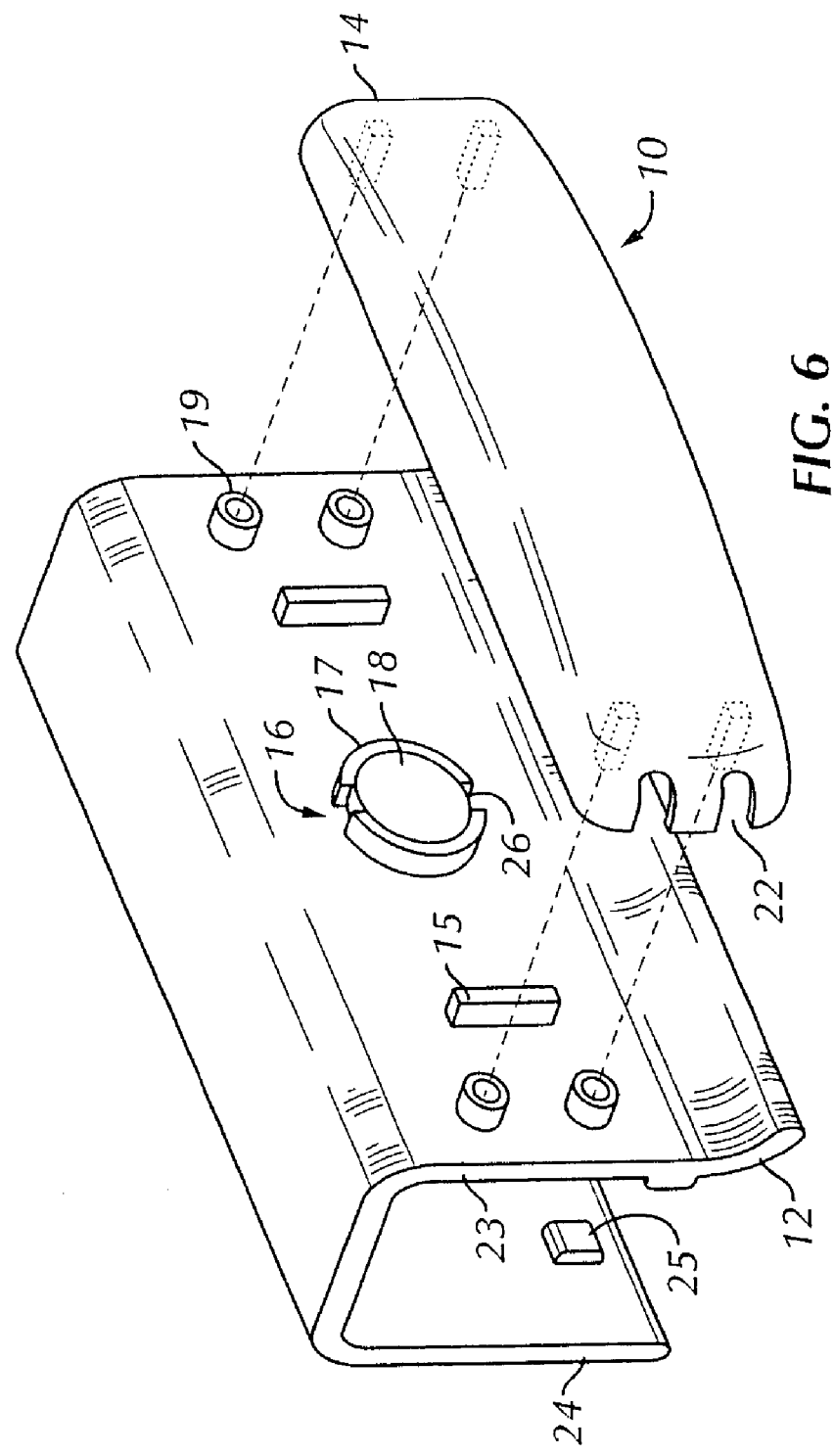
FIG. 6 is a perspective view of another embodiment of the present invention where the insect bait station is located on one of the gripping arms.

However, in embodiments where the container has a relatively close-fitting lid, the bait station is more preferably located on an exposed arm of the clip. For example, FIG. 6 shows an embodiment of the invention where bait station 16 and cover 14 are located on arm 23. When engaged on the lip of a container, the bait station is on the outside edge of the container. This embodiment allows the placement of a cover on the container since the bait station and cover do not then interfere with each other.

Figure 7:
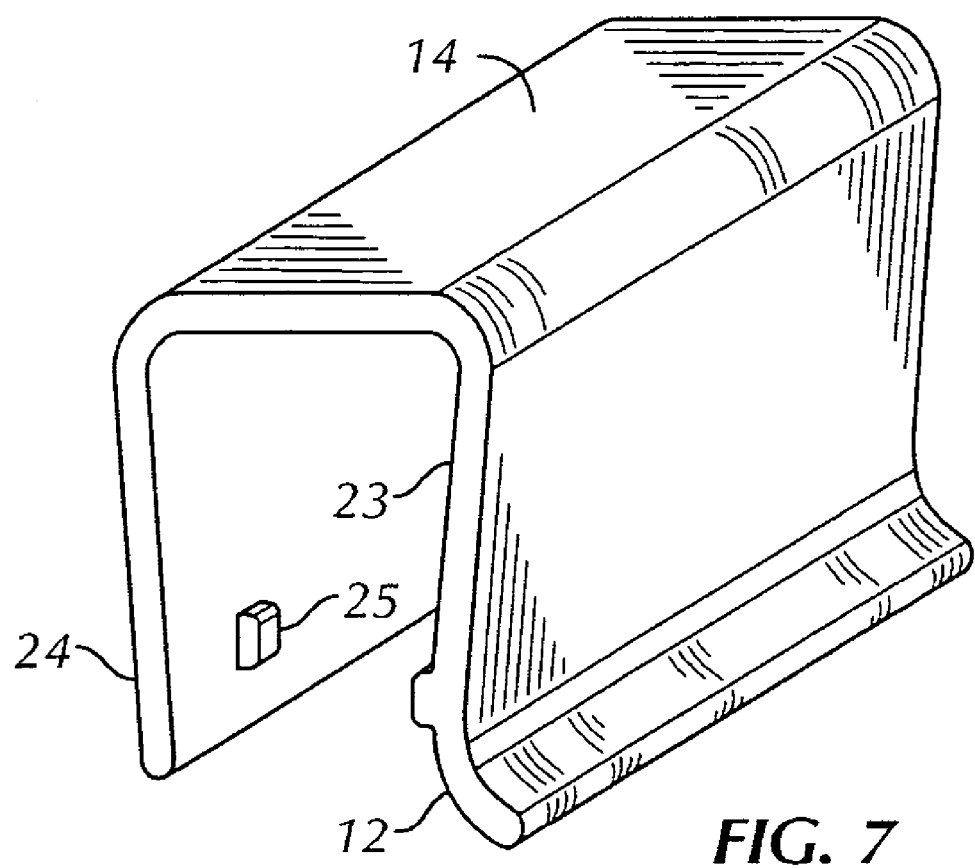
FIG. 7 is a perspective view of the FIG. 1 invention.

In use, embodiments of the invention are merely pushed or forced down so that the arms engage the bag surface overlapping the rim of the container. The clamp as shown in FIGS. 1–6 is relatively rigid. Arms 23 and 24 may be parallel, or approximately parallel in certain embodiments. In other embodiments, one example of which is shown in FIG. 7, arms 23 and 24 may be converging so that they are forced apart slightly when put into an engaging position with the bag and container. This embodiment provides greater securing to the container.

In the embodiments disclosed herein, the only upward projection of the device when engaged on the container is the combined thickness of bridging element 11 and cover 14. It is also contemplated that the clamp may be positioned on the container so that arm 23 and lip 12 are on the outside of the container so that when removal is desired, the user does not necessarily come into contact with the contents of the container. Alternatively, lip 12 may be placed on the inside of the container. Lifting lip 12 allows the clamp to be easily removed and at the same time the clamp nestles in the user's hand.

Certain preferred embodiments have been described above. It is to be understood that a latitude of modification and substitution is intended in the foregoing disclosure, and that these modifications and substitutions are within the literal scope, or are equivalent to the claims that follow. Accordingly, the following claims should be construed broadly and in a manner consistent with the intent and scope of the invention herein described.

What is claimed is:

1. For use with a container formed with an open top surrounded by a rim and normally having a removable lid, a clamp for affixing a pliable bag to a container and for controlling crawling insect populations, the clamp comprising;

a grabbing device selectively capable of an open position and a closed position, said grabbing device comprising;
        spaced opposing arms interconnected by a bridge element which extends between said arms, said arms each having a distal edge extending from said bridge element, said arms having spaced confronting faces which are normally about parallel to each other in the closed position; and at least one of said arms having an extended lip on the distal edge thereof to accommodate manual deformation of the clamp to slightly, selectively spread the distal edges of the arms apart in an open position; and an insect bait station positioned on the outer top surface of the bridge element, said bait station comprising:

a well configured to house bait material; and a cover positioned over said bait station on the outer top surface of the bridge element, said cover shaped and configured to protect the bait well from undesired access and permitting access to the bait by crawling insects, said grabbing device being shaped and configured to affix the bag against a container rim when in the normal closed position, to release the bag from a container rim when in the open position, and said bait station, when armed with bait material, controls the crawling insect population at or near the container.

2. The clamp of claim 1, and further comprising bait material positioned in the well.

3. The clamp of claim 2, wherein the means for access comprises semispherical openings on one surface of the cover.

4. The clamp of claim 3, wherein the bait station further comprises a means for preventing an elongated object inserted into the semispherical openings from coming into contact with the bait material.

5. The clamp of claim 4, wherein said means comprises an object positioned on the bridge element, said object selected from the group consisting of a rectangular bar perpendicular to the end of the device and a v-shaped bar.

6. The clamp of claim 1, further comprising means for securing the cover to the bridge.

7. The clamp of claim 6, wherein said means for securing comprises an interference fit between a peg and a round hole.

8. The clamp of claim 1, wherein said bridge element is shaped and configured with a width corresponding to the width of the rim of the container to which it is intended to engage.

9. The clamp of claim 1, wherein said arms extend from the bridge element in a substantially U-shaped configuration.

10. The clamp of claim 1, wherein said confronting faces of said arms are found with irregularities to facilitate positive engagement with a bag on a container rim.

11. The surface feature of claim 10, wherein said irregularities are semi-spherical bumps.

12. The surface feature of claim 11, wherein said bumps are arranged in an alternating fashion on opposite faces of said arms.

13. The clamp of claim 1, wherein said confronting faces of said arms are formed with a plurality of parallel ridges along the width of the arms.

14. The clamp of claim 1, wherein the arms generally converge toward one another at said distal edges.

15. The clamp of claim 1, wherein the clamp is curved along its horizontal axis corresponding to the curve of the rim of the container to which it is intended to engage.

* * * * *